H. S. HOLMES.
ELECTRIC WELDING APPARATUS.
APPLICATION FILED JAN. 24, 1917.
1,220,848.
Patented Mar. 27, 1917.
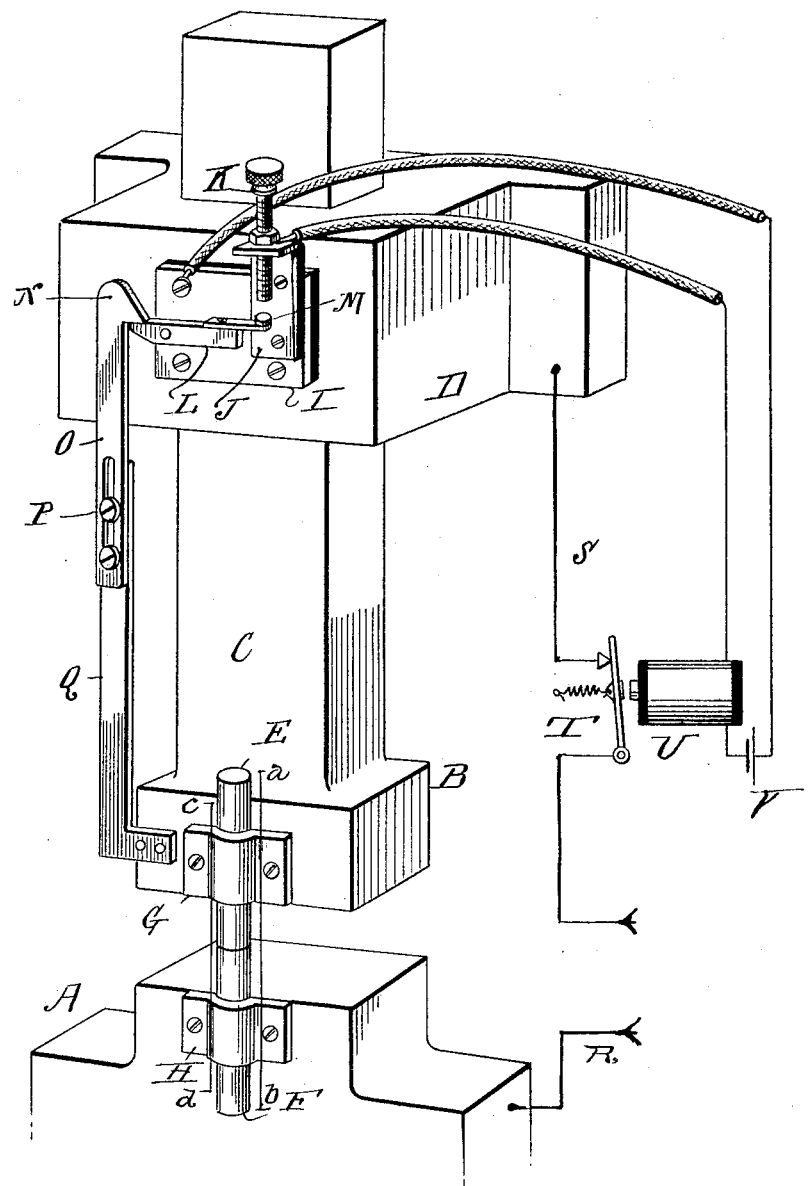
INVENTOR
Henry S. Holmes
BY
his ATTORNEY

UNITED STATES PATENT OFFICE.

HENRY S. HOLMES, OF BROOKLYN, NEW YORK.

ELECTRIC WELDING APPARATUS.

1,220,848.  Specification of Letters Patent.  Patented Mar. 27, 1917.

Application filed January 24, 1917. Serial No. 144,118.

*To all whom it may concern:*

Be it known that I, HENRY S. HOLMES, a citizen of the United States, residing at Brooklyn, in the county of Kings and State of New York, have invented a certain new and useful Improvement in Electric Welding Apparatus, of which the following is a specification.

The invention relates to electric welding, and consists in a device for interrupting the welding current after a predetermined amount of metal has been taken up at the welded joint.

The accompanying drawing shows my device in perspective.

A is the fixed electrode, and B the movable electrode. Electrode B has a rod C which slides vertically in a guide opening in a bracket D. Any suitable means such as now used in electric welding machines, for causing the movement of electrode B toward electrode A, may be provided. E and F are the objects to be welded—here cylindrical rods placed butt to butt and respectively secured to electrodes A and B by clamps G, H.

On the front face of bracket D and insulated therefrom is secured a metal plate I. Secured on and insulated from plate I is a bracket J which supports the adjustable contact screw K. Pivoted to plate I is a lever L, the long arm of which carries a contact M which comes below screw K. The short arm of lever L extends beyond plate I and is engaged by a trigger N on rod O. Near its lower end, rod O is slotted and receives screws P which engage rod Q, which is secured to electrode A.

One supply lead R for welding current is connected to electrode A; the other supply lead S is connected to bracket D. In supply lead S is a switch T, controlled by electro-magnet U. The terminals of magnet U are connected to plate I and bracket J. A separate source of direct current, such as battery V, is included in the magnet circuit.

When two objects to be welded are pressed together during the passage of the welding current, the softened or fused metal at the joint yields to the pressure, and is compressed or forced out of the joint, so that the aggregate length of the two objects measured at right angles to the joint is less after welding than it was before. Thus the aggregate length of the two rods E, F before welding is as shown by the full lines represented by the line $a$, $b$. But if through the welding a certain amount of the metal is extruded at the joint or condensed and compressed thereat, then the aggregate length of the rods may, for example, become represented by the line $c$, $d$. The difference between the total length $a$, $b$ of the two objects measured, as stated, at right angles to the joint before welding, and their total length $c$, $d$ after welding, is commonly called the "take up." The amount of take up will depend upon the material of the welded objects. Thus in welding two rods of cold rolled steel, in order to secure a good weld, the take up may be one-sixteenth of an inch. On the other hand, with rods of machine steel, one-half this take up may be all that is necessary.

My device operates to regulate the take up in the following way:

The objects to be welded are clamped on the electrodes A, B and brought into contact with one another. The screws P being loosened, the rod O is adjusted vertically on rod Q until the trigger N just touches the short arm of lever L. The adjusting screw K is raised for a distance proportionate to the amount of take up desired. That is to say, because the lever L has a long arm and a short arm, the screw K is raised for such a distance as that the short arm of the lever will be drawn down by the trigger N for the predetermined distance before contact M on said long arm meets the end of the screw K. For example, if the predetermined take up is to be one-sixteenth inch, and for a movement of this distance by the short arm, the long arm of the lever L moves over a distance five times as great, then the screw K will be raised a distance of five-sixteenths of an inch. This adjustment having been made, the welding current is established, and the upper electrode B descends until the predetermined take up of metal is caused. At this point, the contact M meets the end of screw K, thus establishing current through magnet U, which opens switch T, thus interrupting the welding current. The metal at the joint instantly hardens, no further take up is possible, and the weld is completed.

The device may be set so as to cause a certain predetermined take up in any number of successive welds. To do this, the electrodes A, B are adjusted at the distance apart which it is desired shall be between them after the take up is made and the weld completed. The screw K is then lowered until it just touches contact M. Electrode A is then raised, and the objects to be welded are placed in the clamps G, H. The objects are brought into contact, and current established. The trigger N is now above and separated from the short arm of lever L, but as the take up continues and electrode A descends, said trigger finally meets said arm. Circuit is then established through magnet U, with the result, as before, of interrupting the welding current.

I claim:

1. An electric welding apparatus, comprising electrodes, one of which is movable, a fixed support, a pivoted lever on said support, an adjustable contact screw coöperating with one arm of said lever, a trigger on said movable electrode engaging the other arm of said lever, a magnet in circuit with said support and said adjusting screw, and a switch controlled by said magnet and controlling the welding current to said electrodes.

2. An electric welding apparatus, comprising electrodes, one of which is movable, a fixed support, a pivoted lever on said support, said lever having arms of unequal length, an adjustable contact screw coöperating with the long arm of said lever, a trigger on said movable electrode engaging the short arm of said lever, a magnet in circuit with said support and said adjusting screw, and a switch controlled by said magnet and controlling the welding current to said electrodes.

3. An electric welding apparatus, comprising electrodes, one of which is movable, a fixed support, a pivoted lever on said support, an adjustable contact screw coöperating with one arm of said lever, an arm on said movable electrode, a trigger adjustable on said arm and engaging the other arm of said lever, a magnet in circuit with said support and said adjusting screw, and a switch controlled by said magnet and controlling the welding current to said electrodes.

In testimony whereof I have affixed my signature in presence of two witnesses.

HENRY S. HOLMES.

Witnesses:
GERTRUDE T. PORTER,
MAY T. McGARRY.

Copies of this patent may be obtained for five cents each, by addressing the "Commissioner of Patents, Washington, D. C."